Feb. 8, 1944. S. MENDELSOHN ET AL Re. 22,433
CAMERA SYNCHRONIZER
Original Filed Oct. 18, 1941 2 Sheets-Sheet 1
Fig. 2.
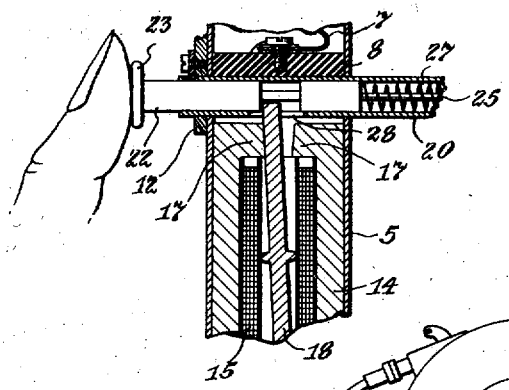
Fig. 1.
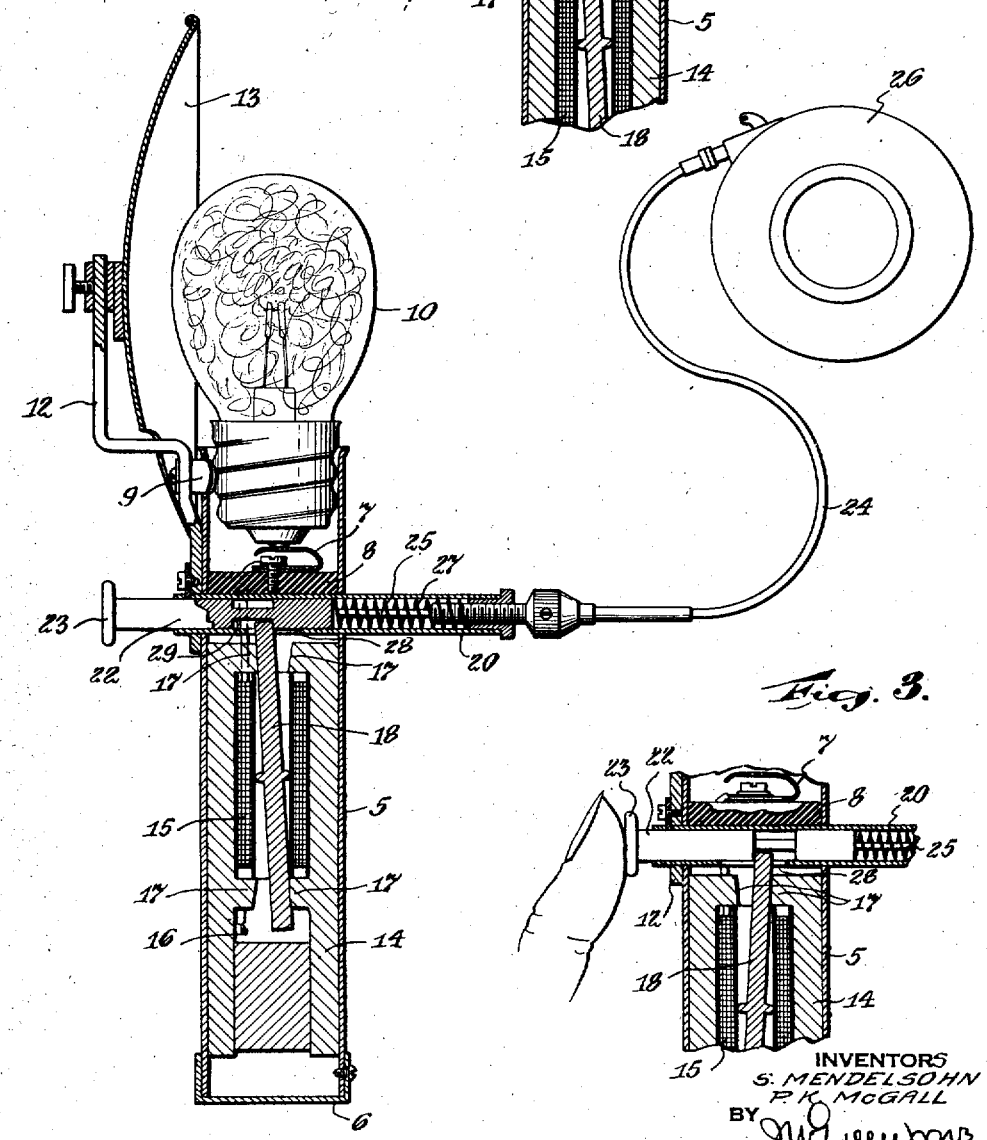
Fig. 3.
INVENTORS
S. MENDELSOHN
P. K. McGALL
BY
ATTORNEY Feb. 8, 1944. S. MENDELSOHN ET AL Re. 22,433

CAMERA SYNCHRONIZER

Original Filed Oct. 18, 1941 2 Sheets-Sheet 2

INVENTORS
S. MENDELSOHN
P. K. McGALL
BY J. H. Greenburg
ATTORNEY

Reissued Feb. 8, 1944 Re. 22,433

UNITED STATES PATENT OFFICE 22,433

CAMERA SYNCHRONIZER

Samuel Mendelsohn, Montclair, and Philip K. McGall, Orange, N. J.; said McGall assignor to said Mendelsohn Original No. 2,328,831, dated September 7, 1943, Serial No. 415,548, October 18, 1941. Application for reissue November 8, 1943, Serial No. 509,476

3 Claims. (Cl. 67—29)

The present invention relates to what is now commonly referred to in the art as a camera synchronizer for opening a camera shutter simultaneously with the moment of peak intensity of a photoflash lamp and may be said to constitute an improvement over the structure as shown in Patent No. 2,204,424, issued June 11, 1940, to S. Mendelsohn, one of the present joint inventors.

In all the present types of camera synchronizers the electrical energy for igniting the photoflash lamp, and for energizing a solenoid when the camera shutter is electrically operated, is supplied by dry cell batteries. Since such batteries too frequently wear out in a comparatively short period of time this has proven to be a source of annoyance to the newspaper photographer or candid camera fan necessitating their keeping spare batteries on hand at all times lest those in the synchronizer go dead at a moment when it is desired to take an important photograph of a non-recurring scene or object.

It is accordingly an object of the present invention to provide a camera synchronizer which requires no batteries for supplying electrical energy for igniting the photoflash lamp or causing opening of the camera shutter.

Another object of the present invention is the provision of a camera synchronizer wherein a source of electrical energy is provided for igniting the photoflash lamp or causing opening of the camera shutter which has a useful life comparable to that of the synchronizer itself.

A further object of the present invention is the provision of a camera synchronizer which is provided with an integral electrical generator of indefinite life which supplies the required electrical energy for igniting the photoflash lamp or causing opening of the camera shutter.

Still further objects of the present invention will become obvious to those skilled in the art by reference to the accompanying drawings, wherein:

Fig. 1 is an elevational view in section of a camera synchronizer constructed in accordance with the present invention and showing the same as mechanically operable to cause opening of the camera shutter;

Fig. 2 is a fragmentary sectional view of the generator portion of the camera synchronizer shown in Fig. 1 illustrating one operating position of the apparatus;

Fig. 3 is a view similar to Fig. 2 showing a further operating position of the electrical generator portion of the camera synchronizer of the present invention.

Figs. 5 to 8 each show still further modifications which the camera synchronizer may take;

Figs. 9 to 12 show various operating positions of another modification, and

Figure 13:
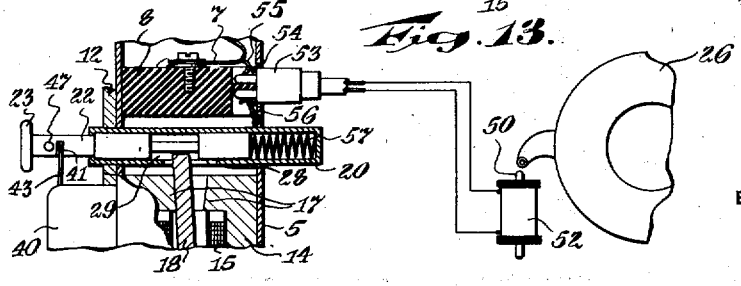

Fig. 13 is a view somewhat similar to Fig. 1 but showing electrical operation of the camera shutter.

Referring now to the drawings in detail the camera synchronizer therein shown comprises a casing 5 closed at one end by an end cap or the like 6 and the opposite open end being provided with a spring contact terminal 7 carried by an insulated block 8, and a metal clip 9 thus forming a socket for a photoflash lamp 10. Also secured to the casing 5 is a bracket 12 which adjustably supports a reflector 13.

An electric generator in the form of a permanent magnet 14 provided with a winding 15 is disposed within the casing 5 with one end of the winding being grounded to the metallic casing 5 as at 16 so as to establish connection through the clip 9 to the shell of the photoflash lamp 10, while the other end of the winding 15, as shown in Fig. 1, is connected directly to the spring contact terminal 7. As will be noted from the several figures the permanent magnet 14 is provided with pole pieces 17 above and below the winding 15 and an armature 18 is maintained in floating condition in the magnetic field of the winding with its ends passing through each of the pole pieces 17.

Extending transversely of the casing 5 is a hollow housing 20 for a slidable plunger 22 having a thumb button 23 exteriorly of the housing. A cable release 24 surrounding a Bowden wire 25 is adjustably connected to the opposite end of the housing 20 which connects to the camera shutter 26 in the customary manner. A coil spring 27 is also disposed within the housing 20 for the purpose of preventing lost motion of the plunger 22.

A notch 28 is provided in the housing 20 to enable the armature 18 to extend therethrough and into a slot 29 provided in the plunger 22. By reference to Fig. 1 it will be noted that in the normal or "cocked" position of the synchronizer the armature 18 is attracted to the upper left hand and lower right hand pole pieces 17, with the magnetic flux flowing through the armature 18 from the pole piece of positive polarity to the one of negative polarity, or from the north to the south pole. When it is desired to take a photograph the operator depresses the thumb button 23 which moves the plunger 22 thus compressing slightly the spring 27 and moving the Bowden wire 25. By the time the plunger has moved so that the shoulder formed at the end of the slot 29 engages the armature 18, as shown in Fig. 2, the camera shutter 26 will be conditioned for opening upon further movement of the plunger 22 to trip the shutter trigger arm, since the cable release connection with the housing 20 is so adjusted relative to the length of the slot 29 that such action takes place.

Further depression of the plunger 22 by the operator overcomes the magnetic force with the result that the metallic contact between the armature 18 and the upper and lower pole pieces 17 is broken very abruptly. This breaking of the metallic contact accordingly induces an electrical impulse in the winding 15 and since the armature rotates about an imaginary pivot (or fixed insulated pivot if desired) an additional impulse is induced as a metallic contact is established between the upper right and lower left hand pole pieces 17, as shown in Fig. 3, with the flow of magnetic flux being now in an opposite direction through the armature 18.

Inasmuch as the camera shutter 26 was conditioned for opening at about the instant the plunger 22 moved the full length of the slot 29, the electrical impulses generated by further movement of the plunger and rotation of the armature 18 are transmitted directly to the photoflash lamp 10 through the socket connecting clip 9 and terminal 7, thus igniting the lamp 10. At about the same time the armature 18 moves with generation of the electrical impulse, the shutter trigger arm is tripped to cause opening of the shutter by the further movement of plunger 22. Moreover, since the photoflash lamp 10 reaches its maximum peak intensity in an extremely short period of time, ranging from about 25 microseconds to 20 milli-seconds, it can be readily seen that complete opening of the camera shutter is very readily synchronized with the moment of peak intensity merely by proper adjustment of the connection of the cable release 24 with the housing 20.

Figure 5:
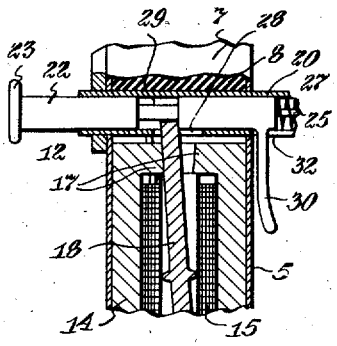

In the embodiment as shown in Fig. 1, the spring 27 is such that its tension is insufficient, even when compressed by depression of the plunger 22 in the taking of a photograph, to return the plunger to the "cocked" position by overcoming the magnetic force tending to hold the armature 18 in the position as shown in Fig. 3. Consequently in order to condition the synchronizer it is necessary that it be again "cocked" by the operator pulling outwardly on the plunger thumb button 23, or the plunger may be provided with an arm 30 passing through a slot 32 such as shown in the modification of Fig. 5.

Figure 4:
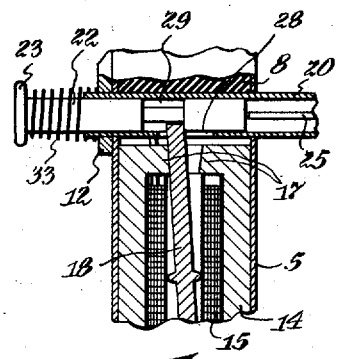
Fig. 4 is a fragmentary view of a modification which the camera synchronizer of the present invention may take.
Figure 6:
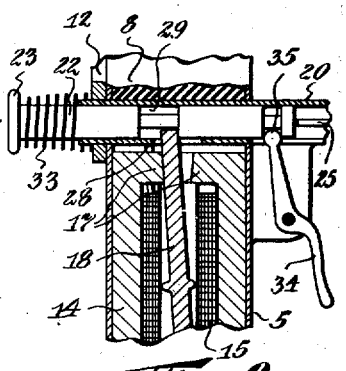
Figure 7:
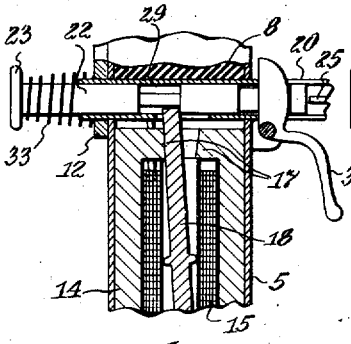
Figure 8:
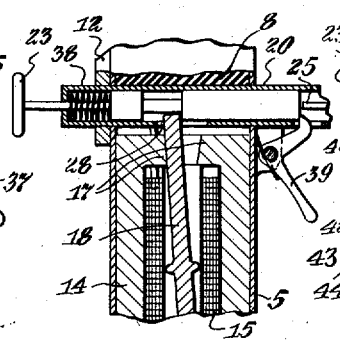

Also various other trigger arrangements may be provided for operating the synchronizer in lieu of the operator depressing the plunger button 23. For example, a spring 33 may be provided between the underside of the button 23 and the casing 5 instead of interiorly of the housing 20, as shown in Figs. 4, 6 and 7, and the pivot bell crank 34 and socket 35 of Fig. 6 provided for moving the piston 22 by pulling on the bell crank lever 34. Still further a cam arrangement 37 such as shown in Fig. 7, may be utilized. In addition a construction as shown in Fig. 8 may prove advantageous wherein a spring 38 is disposed within the housing 20 which is compressed upon "cocking" the plunger and stores sufficient potential energy to cause movement of both the plunger 22 and armature 18 when a spring pressed catch 39 is released by a pulling action on the part of the operator.

In all of the modifications thus far described, wherein manual "cocking" of the synchronizer is necessary prior to the taking of a photograph, there is always the possibility that should the photographer insert a photoflash lamp prior to "cocking" it will be inadvertently ignited by the impulse generated attendant movement of the armature toward "cocking" position. To eliminate this disadvantageous feature a structure as shown in Figs. 9 to 12 may be provided. This modification differs from that of Figs. 1 to 3 merely in the provision of a switch arrangement which allows a circuit to be completed to the photoflash lamp 10 only when the synchronizer is in the "cocked" position.

As shown in Figs. 9 to 12 the casing 5 is provided with an auxiliary housing 40 enclosing a pair of contacts 42 and 43. The contact 42 is secured to the metallic casing 5 and thus forms part of the grounded metallic circuit to the clip 9 and the shell of the lamp 10, whereas the contact 43 is carried by an insulated support 44 and is connected by a wire 45 to the opposite end of the winding 15, instead of the latter being grounded as at 16 in Fig. 1.

Figure 9:
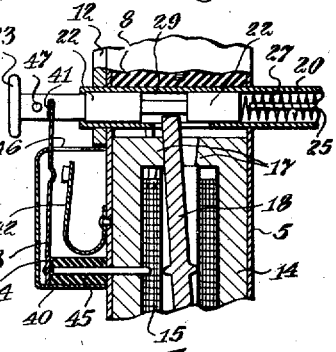

In the normal "cocked" position of the synchronizer as shown in Fig. 9 these contacts are spaced relative to each other with the upper insulated end 41 of the contact terminal 43 extending through a slot 46 provided in the auxiliary housing 40 in spaced relation with a pin 47 carried by the plunger 22.

Figure 10:
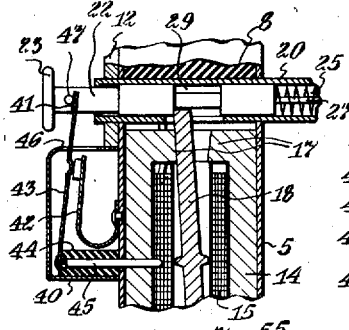
Figure 11:
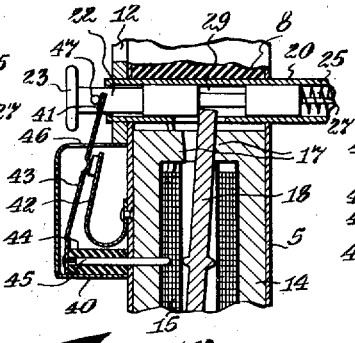
Figure 12:
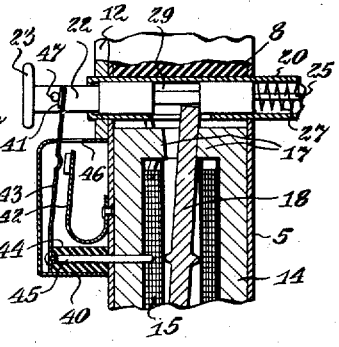

By the time the plunger 22 has been depressed sufficiently to cause the shoulder formed in the slot 29 to engage the end of armature 18, the pin 47 will have engaged the end of contact 43 and flexed it to the right into engagement with the contact 42, as shown in Fig. 10, thus completing the circuit to the photoflash lamp 10. Further depression of the plunger button 23 thus abruptly breaks metallic engagement of the armature 18 with the pole pieces 17 as above described, and since both the contacts 42 and 43 are resilient they yield to the right, as shown in Fig. 11, allowing the plunger 22 to continue its movement to its limit of travel without disengagement of the contact 42 and 43 or interruption of the electrical circuit. However, when the operator removes his thumb from the button 23, the spring 27 together with the potential energy stored in the contacts 42 and 43, returns the plunger 22 in the opposite direction until the right hand shoulder formed at the end of the slot 29 engages the armature 18 such as shown in Fig. 12. At this time the pin 47 will likewise have moved sufficiently to the left to allow separation of the contacts 42 and 43 thus breaking the electrical circuit. Consequently a new photoflash lamp may be inserted in the socket prior to the synchronizer being again "cocked" without fear of the lamp being inadvertently ignited by any impulse attendant movement of the armature, since the electrical circuit to the lamp is not again completed until the plunger has started its movement in the shutter opening direction.

In the modifications above described the opening of the camera shutter is accomplished by mechanical movement. However, the present invention also contemplates the automatic opening of the camera shutter in response to the energization of a solenoid, such for example as shown in Patent 2,204,424, issued June 11, 1940, to S.

Mendelsohn, one of the present co-inventors. Fig. 13 shows this latter type of synchronizer wherein the camera shutter 26 is opened in response to movement of the armature 50 of a solenoid 52, the latter of which is connected in electrical parallel with the photoflash lamp 10. For example, a plug 53 may be inserted through an opening 54 in the casing 5 with the contacts of the plug establishing engagement with a pair of resilient contacts 55 and 56 connected, respectively, to the spring contact 7 and metallic casing 5.

It may also be advantageous in this particular embodiment to have the armature 18 make and break its engagement with the pole pieces 17 twice thus not only automatically "cocking" the synchronizer preparatory to another exposure but in addition generating four rapid electrical impulses instead of two as in the previous modifications. This is readily accomplished merely by making the spring 57 of Fig. 13 of sufficient strength that the energy stored therein upon movement of the plunger will return the latter to its "cocked" position by overcoming the magnetic force tending to hold the armature to the right, as shown for example in Fig. 12.

From the foregoing it should be obvious to those skilled in the art that a synchronizer for opening a camera shutter simultaneously with the moment of peak intensity from a photoflash lamp is herein provided wherein the electrical energy for igniting the lamp is supplied by a self-contained generator requiring no replacement. Moreover, the synchronizer may also be so constructed that the integral electrical generator supplies the energy both for igniting the photoflash lamp and for operating an electrical solenoid which automatically causes opening of the camera shutter. Consequently since batteries are completely dispensed with a photographer need not worry about carrying spares or his synchronizer failing to operate at a cruical moment through lack of sufficient electrical energy to operate.

Although several modifications of the present invention have been shown and described it is to be understood that still further embodiments may be made without departing from the spirit and scope of the appended claims.

What is claimed is:

1. A camera synchronizer for opening a camera shutter simultaneously with the moment of peak intensity from a photoflash lamp comprising a casing, an electric generator in said casing including a magnet and a pivoted armature normally completing a magnetic circuit through said magnet and operable upon movement of said armature about its pivot to generate electrical energy and cause ignition of said photoflash lamp, and a plunger slidable in said casing engageable with said pivoted armature and connected to the camera shutter and operable upon depression thereof to cause opening of the camera shutter and abrupt breaking and making of the magnetic circuit by movement of said armature about its pivot to cause the resulting energy impulses to ignite said photoflash lamp with peak intensity thereof in synchronism with complete opening of the camera shutter.

2. A camera synchronizer for opening a camera shutter simultaneously with the moment of peak intensity from a photoflash lamp comprising a casing, an electric generator in said casing including a magnet and a pivoted armature normally completing a magnetic circuit through said magnet and operable upon movement of said armature about its pivot to generate electrical energy of sufficient magnitude to ignite said photoflash lamp, a housing extending transversely of said casing provided with an elongated opening through which one end of said armature projects, a plunger slidable in said housing and operable upon depression thereof to cause opening of the camera shutter, and said plunger having a slot provided with a shoulder engageable with said armature after partial movement thereof to cause movement of said armature about its pivot upon further movement of said plunger with abrupt breaking and making of said magnetic circuit and ignition of said photoflash lamp by the ensuing energy impulses with peak intensity of said lamp in synchronism with complete opening of said camera shutter.

3. A camera synchronizer for opening a camera shutter simultaneously with the moment of peak intensity from a photoflash lamp comprising a casing, an electric generator in said casing including a permanent magnet provided with pole pieces and having a pivoted armature normally completing a magnetic circuit between said pole pieces and a winding surrounding said armature for generating impulses of sufficient magnitude to ignite a photoflash lamp upon breaking and making said magnetic circuit, a housing extending transversely of said casing provided with an elongated opening through which one end of said armature projects, a plunger slidable in said housing and operable upon depression thereof to cause opening of the camera shutter, said plunger having a slot provided with a shoulder engageable with said armature after partial movement thereof to cause movement of said armature about its pivot upon further movement of said plunger, and a normally open switch carried by said casing and closable by movement of said plunger in the shutter opening direction to connect said winding to said photoflash lamp and to cause the impulses generated in said winding attendant the breaking and making of said magnetic circuit by movement of said armature about its pivot to ignite said photoflash lamp with peak intensity thereof in synchronism with complete opening of the camera shutter.

SAMUEL MENDELSOHN.
PHILIP K. McGALL.